Feb. 5, 1963 K. L. SMITH 3,076,599

STATISTICAL RECORD READING DEVICES

Filed July 20, 1959 2 Sheets-Sheet 1

Inventor
KENNETH L. SMITH
By Imirie & Smiley
Attorneys

Feb. 5, 1963 K. L. SMITH 3,076,599

STATISTICAL RECORD READING DEVICES

Filed July 20, 1959 2 Sheets-Sheet 2

Inventor
KENNETH L. SMITH
By Imirie & Smiley
Attorneys 3,076,599

STATISTICAL RECORD READING DEVICES

Kenneth L. Smith, Southampton, England, assignor to International Computers and Tabulators Limited, London, England, a British company Filed July 20, 1959, Ser. No. 828,242
Claims priority, application Great Britain Oct. 22, 1958
4 Claims. (Cl. 235—61.11)

This invention relates to statistical record reading devices, and particularly to devices for reading statistical records in which there is relative movement between a record and a sensing means.

In devices for reading statistical records such as record cards carrying data-indicating perforations, a record is sometimes moved relative to a sensing means, during sensing of the record, by mechanical feeding devices such as feed rollers, and data-indicating signals read from a record are transmitted to a data-utilization device.

However, a certain amount of slipping can occur when the leading edge of a record is presented to feed rollers, so that the sensing of positions for data-indications on the record is not always in proper timed relation with conditioning means which conditions the sensing means to accept and transmit data-indicating signals to a data-utilization device.

It is an object of the present invention to provide a statistical record reading device which is conditioned to effect sensing of a record only when a data-indicating position of the record to be sensed is located in sensing relation with the sensing means.

According to the invention there is provided a statistical record reading device, comprising sensing means operable during successive sensing periods as herein defined to sense data-indicating positions of a moving record, a clock pulse generator operable to produce a train of clock pulses of which a predetermined number greater than one occur during each sensing period, and at least one during the sensing of each data-indicating position, a clock pulse counter connected to the clock pulse generator and having a maximum capacity equal to said predetermined number, and setting means connected to the counter and the sensing means and operable under control of the record to set the counter to an initial state thereof preparatory to a first sensing period, said counter, following the setting thereof, being operable on regular predetermined counts thereof to condition the sensing means to transmit an electric signal indicative of a data-indication sensed thereby.

In order that the invention may be clearly understood one embodiment thereof will now be described, by way of example, with reference to the accompanying drawings, in which.

As is well understood, each vertical column of a record card usually contains twelve positions for data-indications sometimes identified by the letters A, B, O and the numerals 1 to 9.

Figure 1:
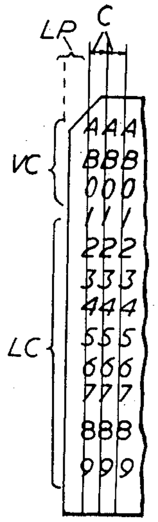
FIGURE 1 illustrates a part of a statistical record card.

The portion of the card in which the 1 to 9 positions are provided is sometimes known as the lower curtate LC, FIGURE 1, and the portion in which the A, B and O positions are provided is sometimes known as the upper curtate UC, and the terms "upper curtate" and "lower curtate" will, where convenient herein, be used to refer to these portions of a card or a card column.

Figure 2:
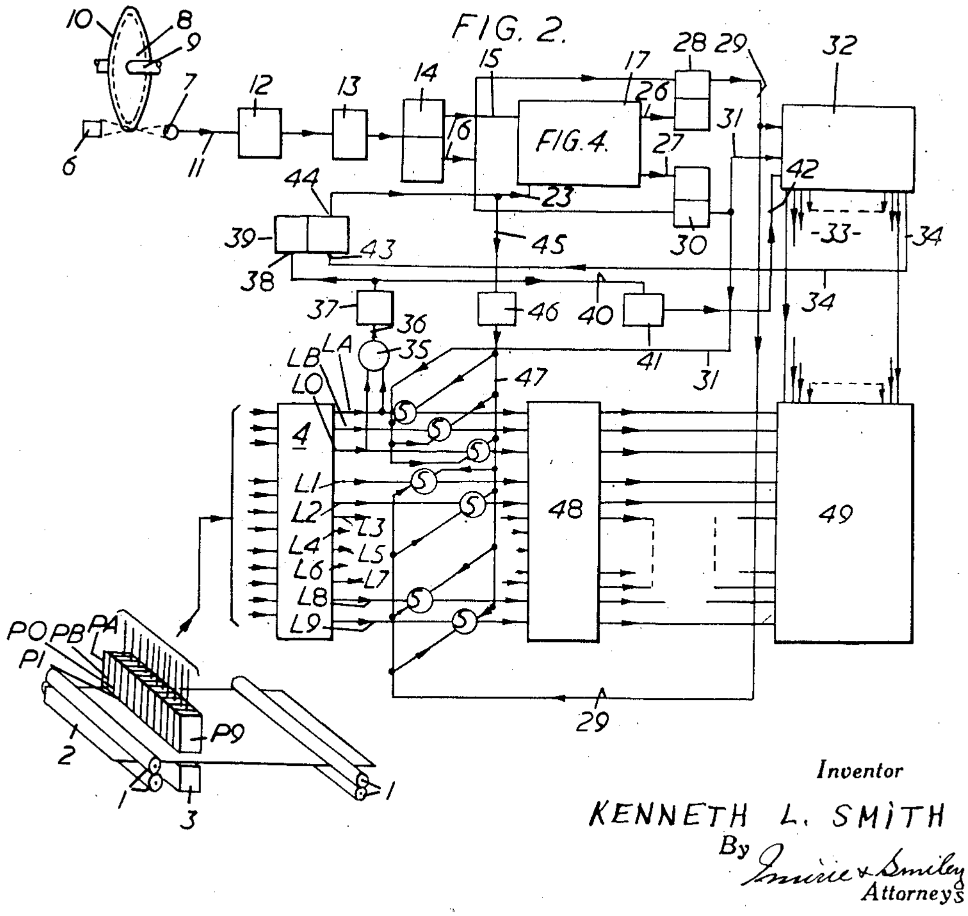
FIGURE 2 is a schematic diagram of a statistical record reading device according to the invention.

A reading device for reading statistical record cards of the kind referred to above is shown in FIGURE 2, and comprises a feeding device of known kind which includes feed rollers 1 for effecting movement of a card 2 past sensing means. The sensing means includes illuminating means 3 to illuminate all data-indicating positions of a column of the card 2, at which a data-indicating hole may be punched, and a number of sensing devices one for each position of a column. Each sensing device is a sensing photoelectric device P1 to P9, PO, PB, PA, respectively arranged to respond to light transmitted from the illuminating means 3 through a data-indicating hole punched in one of the positions 1 to 9, O, B or A of a column.

Each of the photoelectric devices P1 to P9, PO, PB and PA is connected to an amplifier individual thereto. The twelve amplifiers are shown generally as an amplifying device 4. Inverted, negative-going outputs from the amplifiers are transmitted on lines L1 to L9, LO, LB and LA which are connected thereto and each of these lines is connected to one input of a negative coincidence gate 5, the operation of which will be described below.

In order to provide a time scale for the reading of data-indications from a card there is provided a clock pulse generator which is operable in timed relation with the feeding device for the card to produce a train of clock pulses of which a predetermined number greater than one occur during each sensing period, a sensing period being the time taken by a card to move a distance equal to the columnar pitch C of the card, FIGURE 1, past the sensing photoelectric devices P1 to P9, PO, PB, PA. It will be understood that the data-indicating positions do not occupy the whole columnar pitch of each column of the card, and at least one of the clock pulses occurs during the sensing of each data-indicating position. The clock pulse generator comprises a light source 6, FIGURE 2, a clock photoelectric device 7 arranged to be illuminated by the light source 6, and a light chopper disc 8 interposed between the source 6 and the device 7. The light chopper disc 8 is mounted on a shaft 9 which is driven in timed relation with the feed rollers 1 so that eight holes 10 of a ring of holes provided in the disc 8 pass between the light source 6 and the photoelectric device 7 in each sensing period. The output from the photoelectric device 7 on the line 11 is a train of positive-going clock pulses CP, FIGURE 3, eight of which occur during each sensing period.

Figure 3:
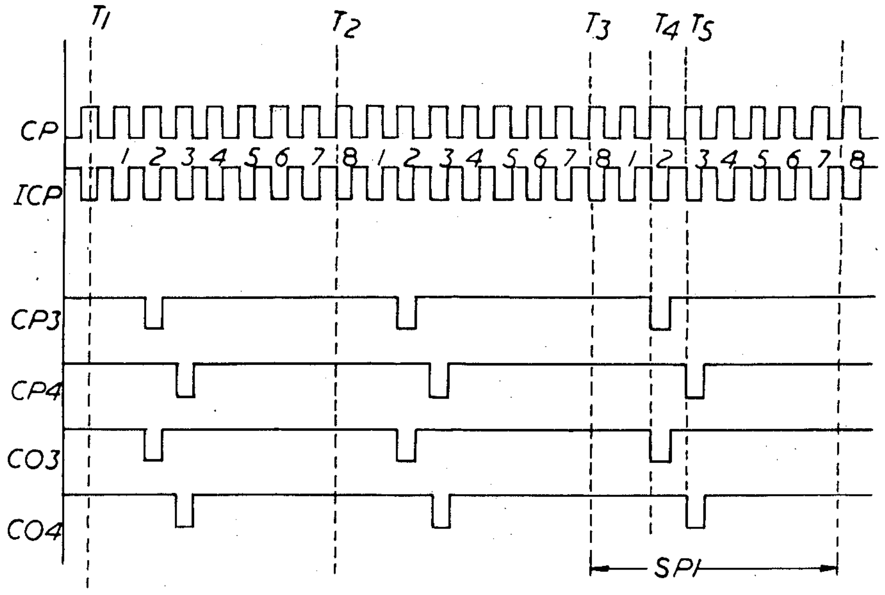
FIGURE 3 is a diagram of waveforms produced in the reading device.

The line 11, FIGURE 2, is connected to a clock pulse amplifier 12 which amplifies and inverts the clock pulses CP and transmits a train of negative-going inverted clock pulses ICP, FIGURE 3, through a cathode follower 13 to a pulse shaper 14 which is a Schmitt trigger circuit, and which has two outputs, one on line 15 corresponding to the shaped, inverted clock pulses ICP, and the other on line 16 being the inverse of the output on line 15 and therefore corresponding to the clock pulses CP.

The shaped, inverted clock pulses ICP on line 15 are used to trigger a clock pulse counter 17, which is described in greater detail below with reference to FIGURE 4. The clock pulse counter has a maximum capacity of eight, and accordingly reaches its maximum capacity once during each sensing period.

Figure 4:
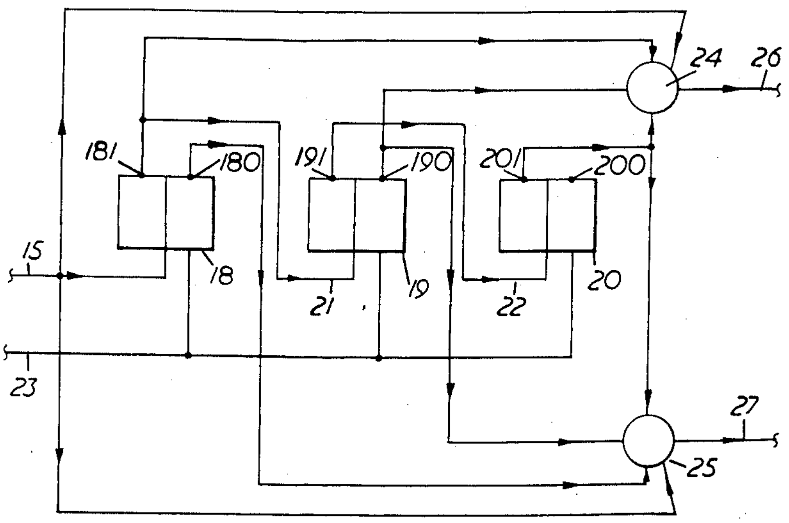
FIGURE 4 is a schematic diagram of a clock pulse counter.

As shown in FIGURE 4, the clock pulse counter 17 comprises three bi-stable trigger stages 18, 19 and 20 of any suitable known kind. The input to each of the trigger stages is so connected that a negative-going pulse on the input triggers the stage. Each of the trigger stages has two outputs which are respectively raised in potential when the stages are in the "0" or the "1" state thereof, and each trigger stage includes two cathode followers, one in each output to provide low impedance outputs from the trigger stages. Outputs 180, 190 and 200 are raised in potential when the stages are in the"0" state, and outputs 181, 191 and 201 are raised in potential when the stages are in the "1" state. Output 181 is connected by a line 21 to the input to stage 19 and output 191 is connected by a line 22 to the input to stage 20. The stages 18, 19 and 20 are connected to a setting line 23, so that when a setting pulse is transmitted on line 23 the stages are all reset to the "0" state thereof.

A negative coincidence gate 24 has inputs connected to the outputs 181, 190 and 201 of the trigger stages, and a further input connected to the line 15. A second negative coincidence gate 25 has inputs connected to the outputs 180, 190 and 201 of the trigger stages and to line 15.

Consider that the counter is standing on zero, that is the stages 18, 19 and 20 are all in the "0" state thereof, and the outputs 180, 190 and 200 are raised in potential. The negative-going front edge of the next inverted clock pulse ICP to be transmitted to the counter triggers the stage 18 to the "1" state thereof, and the negative-going front edge of the second inverted clock pulse ICP triggers the counter to a state in which outputs 181, 190 and 201 are down in potential, so that the second inverted clock pulse on line 15 will pass through the gate 24 to give an output CP3, FIGURE 3, on line 26, FIGURES 2 and 4.

Similarly the negative-going front edge of the third inverted clock pulse ICP triggers the counter to the state in which the outputs 180, 190 and 201 are down in potential and the third inverted clock pulse ICP will pass through the gate 25 to give an output CP4, FIGURE 3, on line 27, FIGURES 2 and 4.

Line 26 is connected to one input of a bi-stable trigger circuit 28, FIGURE 2, the other input of which is connected to line 16. The trigger circuit 28 is set by the negative-going front edge of the waveform CP3, FIGURE 3, and is reset by the next negative-going back edge of the waveform CP, FIGURE 3, on line 16, FIGURE 2. The output from the trigger circuit 28, on line 29 will be the waveform CO3, FIGURE 3. Similarly on the line 27, FIGURE 2, is connected to one input of a further bi-stable trigger circuit 30, the other input of which is connected to line 16, and the output from the trigger circuit 30 is represented by the waveform CO4, FIGURE 3, which occurs on output line 31, FIGURE 2.

The line 29 is connected to each of the negative coincidence gates 5, FIGURE 2, for the lines L1 to L9, and line 31 is connected to the gates 5 for the lines LA, LB, LO. Lines 29 and 31 are also connected to a shift register 32 which is a magnetic core shift register of the kind described in copending British application No. 27,884/58. The shift register includes a number of stages equal to twice the number of columns in the card 2, plus four initial stages, as described below, and one final stage. The 1st, 3rd, 5th . . . stages are connected to line 29 and the 2nd, 4th, 6th . . . stages are connected to line 31. The shift register 32 is operable, as described below, to energise successively a number of lines 33 one for each shift register stage, except the four initial stages and the final stage, two of the lines 33 being energised successively during the sensing of the data indicating positions of each column. The final stage of the shift register is connected by a line 34 to setting means for the clock pulse counter 17.

The setting means includes a positive coincidence gate 35 having inputs connected to the lines LA and LO and an output on line 36 connected through an inverter 37 to one input 38 of a card/no card, bistable trigger circuit 39. The output from the inverter 37 is also connected by a line 40 to a delay circuit 41 which is connected by a line 42 to the first stage of the shift register 32. The other input 43 to the trigger circuit 39 is connected to the line 34. An output 44 from the trigger circuit 39 is connected to the setting line 23 for the clock pulse counter 17, and the output 44 is also connected by a line 45 through a cathode follower 46 and by a line 47 to all of the gates 5.

When there is no card passing between the illuminating means 3 and the photoelectric devices P1 to P9, PO, PB, PA, the photoelectric devices are illuminated and give positive outputs. These outputs are amplified and inverted by the amplifiers 4 so that lines LA and LO are both down in potential and line 36 is also down in potential. When a card 2 is fed by the feed rollers 1 between the illuminating means 3 and the photoelectric devices, the leading portion LP, FIGURE 1, of the card cuts off the light to the photoelectric devices and the potential on lines LA and LO rises. The gate 35 gives a positive output on line 36, which is inverted by the inverter 37 so that a negative-going pulse is transmitted to the input 38 of the trigger circuit 39 and on line 40 to the delay circuit 41. This pulse is delayed by the delay circuit for a time interval of length between once and twice the time occupied by a clock pulse CP, FIGURE 3, so that a marker pulse transmitted on line 42, FIGURE 2, to the shift register 32 is not coincident with a pulse on line 29. The negative-going pulse transmitted to the input 38 of the card/no-card trigger circuit 39 triggers the trigger circuit 39 so that the potential of the output 44 falls, and a setting pulse is transmitted to the counter 17 on the setting line 23 to set the counter 17 to the initial "0" state thereof so that the counter then starts counting from its "0" state.

The first two pulses CO3 and the first two pulses CO4 shift the marker pulse through the four initial stages of the shift register, during the passage of the leading portion LP of the card 2 between the illuminating means 3 and the photoelectric devices P1 to P9, PO, PB, PA, and at time T4 during the sensing period SP1 for the first column of the card the marker pulse is shifted from the fifth stage of the shift register so that a current pulse is transmitted on the first of the lines 33. Thereafter as pulses CO3 and CO4, FIGURE 3, on lines 29 and 31, FIGURE 2, are transmitted to the shift register 32, the marker pulse is shifted through the shift register, and the lines 33 are energised in succession, during the sensing of the data-indicating positions of each two columns of the card.

As the potential of the output 44 of the trigger circuit 39 falls the potentials of the lines 45 and 47 also fall, and the gates 5 are rendered active. When the last column of the card has been sensed, the trigger circuit 39 is reset by a potential on line 34, and the gates 5 are rendered inactive and therefore cannot transmit any data-indicating signals except when a card is passing between the illuminating means 3 and the sensing photo-electric devices P1 to P9, PO, PB, PA.

The operation of the setting means and the clock pulse counter 17 is illustrated in FIGURE 3. At time T1 the leading portion of a card interrupts the illumination of the sensing photoelectric devices by the illuminating means, and the clock pulse counter 17 is set to the "0" state thereof. The counter 17 will count the next eight inverted clock pulses ICP and will return to its "0" state at time T3 when the counter 17 has gone through a further complete counting cycle following the transmission of a further eight inverted clock pulses ICP thereto and the whole of the leading portion LP of the card has passed between the illuminating means 3 and the sensing photoelectric devices. The data-indicating positions of the first column of the card are then sensed during sensing period SP1 and eight inverted clock pulses ICP are transmitted to the counter 17 in sensing period SP1. At time T4 when the potential of line 29 falls the gates 5 which are connected to the lines L1 to L9 will operate so that a data-indicating signal corresponding to a data-indication sensed from the lower curtate of the first column of the card is transmitted through the appropriate cathode follower 48 to a data-utilising device, shown as a data storage device 49 of any suitable known kind, for example a magnetic core storage device.

The data storage device 49 has two storage locations for each column of the card 2, that is a storage location appropriate to the upper and lower curtate of each column. Each storage location is addressed by one of the lines 33, and at time T4 the first of the lines 33 is energised and the signal representative of a data-indicating hole punched in the lower curtate of the first column of the card is written in the appropriate storage location.

At time T5, the potential of line 31 falls, the gates 5 connected to lines LO, LA and LB operate and a data-indicating signal corresponding to a data-indication sensed from the upper curtate of the first column of the card is transmitted through the appropriate cathode follower 48 to the appropriate storage location which is addressed by the energisation of the second line 33 at time T5.

Since the sensing means is conditioned on regular counts of two and three of the clock pulse counter which has a maximum capacity of eight, any discrepancy between the conditioning of the sensing means, and the passage of a card between the feed rollers, due to slipping which occurs when the leading edge of the card is presented to the feed rollers prior to passing the sensing photoelectric devices, is reduced to a maximum of one eighth of a sensing period.

It will be apparent that if it is not required to condition the sensing means for the upper and lower curtate of a card column at different times, all of the gates 5 may be connected to the line 29 or all to the line 31, so that signals on all of the lines L1 to L9, LO, LB and LA are transmitted through the gates 5 to the storage device 49 at the same time. The storage device may then consist of a number of storage locations equal to the number of columns of the card, and the shift register would consist of a number of stages equal to the number of columns plus two initial stages and one final stage.

It will also be understood that if the columns of a card are divided into three groups of data-indicating positions to permit code-punching of data, the sensing devices and sensing gates are divided into three groups, and the groups of sensing gates are conditioned in succession.

I claim:

1. A statistical record reading device, comprising a line of spaced-apart sensing devices operable during successive sensing periods to sense regularly spaced lines of data-indicating positions of a statistical record, means for feeding said record past said line of sensing devices, a clock pulse generator operable in synchronism with the feeding means to generate a train of clock pulses of which a predetermined number greater than one occur during each sensing period, a pulse counter connected to the clock pulse generator and having a maximum capacity equal to said predetermined number and operable to produce a regular train of output pulses which respectively occur during the sensing of successive data-indicating positions, setting means connected to the counter and including first signal gating means connected to the sensing devices and operable to produce a synchronising pulse immediately the presence of a moving record is sensed, and operable by the synchronising pulse to set the counter to an initial state thereof preparatory to the first sensing period, so that the counter resets to that initial state at the end of each said sensing period, and second signal gating means connected to said sensing devices and to the counter output and controlled by said output pulse train to produce regularly timed signals representing data sensed from the regularly spaced lines of data-indicating positions of said record.

2. Apparatus for reading record cards each having a plurality of data recording positions arranged in rows and columns, including a plurality of spaced apart sensing devices, one for sensing each row of recording positions on a card, means for feeding the record cards seriatim column-by-column past the sensing devices, means connected to the sensing devices for deriving from the sensing devices a synchronising signal indicative of the passage of the leading edge of each card past the sensing devices, a source of clock pulses connected to and operating in synchronism with said feeding means, a pulse counter connected to said clock pulse source and responsive to the clock pulses to cycle during the sensing of each column thereby generating a train of output pulses, the time interval between successive output pulses being the time interval between the sensing of adjacent columns of a card, and means for applying each synchronising signal to the counter to reset it to zero thereby resynchronising said output signals to the card feeding means for the reading of each card.

3. Apparatus for reading record cards each having a plurality of data recording positions arranged in rows and columns, including a line of sensing devices, one for each row of recording positions on the record card, means operable to feed the record cards sequentially column-by-column past the line of sensing devices; means connected to the sensing devices for deriving synchronising signals from said sensing devices, each synchronising signal indicating the passage of the leading edge of a card past the line of sensing devices, a source of clock pulses connected to and operating in synchronism with said feeding means, a pulse counter connected to said pulse source and operable by the clock pulses to generate two trains of output pulses, the time interval between adjacent output pulses in each train being equal to the time interval between the sensing of adjacent columns of a card and each pulse of one train occurring in the interval between pulses of the other train, setting means connected to said synchronising signal deriving means for setting said counter to a predetermined state in response to each synchronising signal, a multi-stage shifting register connected to the pulse counter to receive said two trains of output pulses which are applied to the shifting register as shift pulses, means to derive timing signals from the individual stages of the shifting register, first signal gating means connected to a first group of said sensing devices and to said counter and controlled jointly by data representing signals derived from said first group of sensing devices and by one of said trains of output pulses, second signal gating means connected to a second group of said sensing devices and to said counter and controlled jointly by data representing signals derived from said second group of sensing devices and by the other of said trains of output pulses, and a multi-position data storage device connected to the outputs from said first and second signal gating means and to said shifting register and controlled jointly by said timing signals and by data representing signals from said first and second signal gating means.

4. Apparatus according to claim 3, including a bistable device connected to said synchronising signal deriving means and to one stage of said shifting register so that the bistable device is set to a first state by said synchronising signals and to the other state by a signal derived from said one stage of said shifting register and means connected to an output from the bistable device for applying a signal from the bistable device to said first and second signal gating means to render them ineffective when the bistable device is in said other state.

References Cited in the file of this patent

UNITED STATES PATENTS

| | | |
|---|---|---|
| 2,848,535 | Hunt | Aug. 19, 1958 |
| 2,921,736 | Hatherell et al. | Jan. 19, 1960 |

Disclaimer 3,076,599.—*Kenneth L. Smith*, Southampton, England. STATISTICAL RECORD READING DEVICES. Patent dated Feb. 5, 1963. Disclaimer filed Dec. 30, 1966, by the inventor; the assignee, *International Computers and Tabulators Limited*, assenting.

Hereby enters this disclaimer to claim 2 of said patent.

[*Official Gazette February 7, 1967.*]